UNITED STATES PATENT OFFICE.

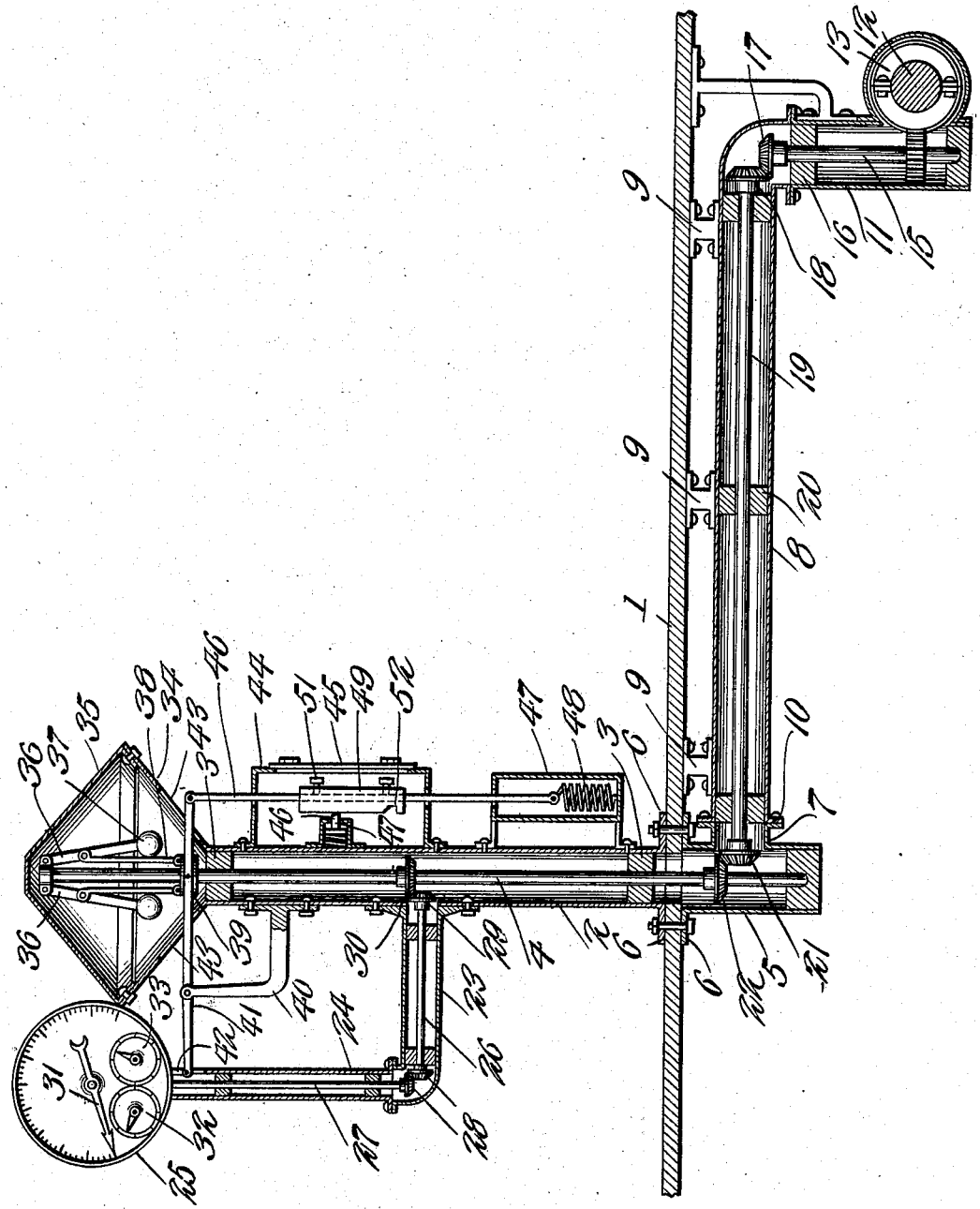

NEWNAN C. FORBUS, OF HARTFORD, ARKANSAS.

INDICATOR.

No. 899,966.      Specification of Letters Patent.      Patented Sept. 29, 1908.

Application filed June 30, 1908. Serial No. 441,072.

To all whom it may concern:

Be it known that I, NEWNAN C. FORBUS, a citizen of the United States, residing at Hartford, in the county of Sebastian and State of Arkansas, have invented new and useful Improvements in Indicators, of which the following is a specification.

The invention relates to an improvement in indicators, and is particularly directed to an indicator adapted for use with a power propelled vehicle and so constructed that the brakes may be automatically applied when the indicator notes a certain predetermined speed.

The main object of the present invention is the provision of an indicator in which the speed noting pointer is directly controlled by governing mechanism driven from a movable part of the vehicle, said mechanism being arranged to automatically control the brake governing valve to permit actuation of said valve to set the brakes when the speed noting pointer indicates a certain predetermined speed.

Another object of the invention is the construction of the valve releasing element adapted for actuation by the governor, so as to permit said element to be manually adjustable to set the same for the release of the valve at any desired speed of the vehicle, whereby the automatic actuation of the brakes may be induced at any desired speed of the vehicle.

The invention will be described in the following specification, reference being had particularly to the accompanying drawings, in which the figure represents a sectional view, partly in elevation, of the improvement.

The present invention is illustrated as applied to a locomotive, being designed to indicate the speed at which the locomotive is traveling, the number of miles traveled and to automatically control the air brake system with which the train is equipped. It is to be understood, however, that I do not desire to limit the present invention to the particular use shown and described, contemplating broadly the application of the indicator for use with any power propelled vehicle in which fluid pressure braking means are provided.

In the use of the invention illustrated 1 represents the foot board of a locomotive to which, at an appropriate point, is secured a hollow standard 2, in which are secured bearing blocks 3 to receive and support a governor shaft 4. The shaft 4 extends below the foot board being housed in an extension 5 of the standard 2, both the extension and housing being preferably formed with laterally projected end flanges 6 to be bolted or otherwise secured to the foot board. The extension 5 is formed with a side opening and with an annular laterally projecting flange 7 forming the wall of said opening. A bearing sleeve 8 is secured to the foot board 1 by brackets 9 fixed to the lower surface of said board, one end of said sleeve being secured at 10 to the flange 7, the opposite end of the sleeve being secured to a depending sleeve extension 11, which terminates adjacent an axle 12 of the pony truck of the engine. Secured on the axle 12 is a worm gear 13, preferably of sectional construction to permit convenient connection to and disconnection from the axle, said gear 13 being arranged to mesh with a gear 14 secured upon a shaft 15 supported in bearing blocks 16 arranged within the sleeve extension 11, the relatively upper end of the shaft 15 being provided with a bevel gear 17 to mesh with a similar gear 18 fixed on the adjacent end of a power shaft 19. The shaft 19 is supported in bearing blocks 20 arranged within the sleeve 8, the relatively inner end of said shaft being provided with a bevel gear 21 arranged to mesh at all times with a bevel gear 22 fixed on the governor shaft. By this construction regular and uniform movement is imparted to the governor shaft 4 from the axle of the pony truck during travel of the engine in either direction.

At an appropriate point in the standard 2 there is secured a bearing sleeve 23, which at its outer end, is arranged to support a second bearing sleeve 24, the latter being extended in parallel relation to the main standard 2 and carries at its upper end an indicator 25. Within the bearing sleeves 23 and 24 are arranged shafts 26 and 27, the meeting ends of which are adapted for operable connection through bevel gears 28, the relatively inner end of the shaft 26 being provided with a bevel gear 29 at all times in mesh with a bevel gear 30 fixed on the governor shaft. The indicator 25 arranged in dial form carries a central pointer 31 and two independent dials 32 and 33. The pointer is arranged to indicate the speed at which the indicator is traveling, while the independent dials are designed to indicate the mileage, one, as 32, being arranged to indicate the miles traveled in one direction, while the other, as 33, being arranged to indicate the miles traveled in the opposite direction, thereby providing for indicating the mileage in the travel of the locomotive in either direction. The mechanism of the indicators 32 and 33 is not shown, it being understood that such mechanism forms no material part of the present invention. The shaft 27 directly drives the mechanism of both indicators, said mechanisms having such clutch connections that in the movement of the shaft in one direction only one of said mechanisms will be affected, the remaining mechanism being driven by the shaft when the latter is operated in the reverse direction. The upper end of the standard 2 is formed or provided with a conical housing 34 having a removable conical cover 35, within which housing the upper end of the governor shaft terminates. The upper end of the governor shaft is provided with diametrically opposed governor arms 36 terminally carrying balls or weights 37, said arms being connected by links 38 to a collar 39 slidably mounted on the governor shaft.

Secured to the standard 2 adjacent the upper end thereof is a bracket arm 40, which extends laterally from the standard and then upwardly to provide a pivotal support for an operating lever 41. One end of the lever extends to and beneath the indicator 25, being connected by a link 42 with the mechanism for operating the pointer 31. The opposing end of the lever projects through slots 43 arranged in diametrically opposed relation in the wall of the casing 34, said lever within the casing being connected to the collar 39. The collar is preferably formed with an annular groove in which is seated a removable strap having connection with the lever, whereby the collar is free to revolve independent of the lever.

Secured upon the standard 2, at an appropriate point in its length, is a housing 44, preferably of rectangular construction and formed with an opening closed by a door 45. The outer end of the lever 41 terminates above the housing 44 and is connected to a rod 46 which extends through the housing, and terminates within a casing 47 arranged below the housing and also secured to the standard 2, the end of the rod 46 within the casing being connected to one end of a spring 48, the opposite end of which is connected to the casing. The spring is tensioned to normally maintain the rod connected end of the lever in lowermost position, that being the normal position of the parts. Projecting within the casing 44 is a valve casing 46 within which is arranged a spring pressed valve 47 having the stem 48 projecting into the casing 44. The valve 47 and casing 46 are intended to represent a connection in or leading from the pressure pipe leading to the engineer's valve, the parts being so arranged that when the valve 47 is moved inward against the tension of the spring, the outlet controlled by said valve 47 is closed, while when the valve is moved outward to the limit of the movement induced by the spring the opening controlled by the valve is open and the bleeding of the train pipe permitted with the effect to set the brakes. Secured upon the rod 46 within the casing 44 is a controlling block 49. This block is longitudinally cored for the free passage of the rod 46, and is secured at any desired position on said rod through the medium of set screws 51. The block in the face next the valve 47 is formed near its lower end with a depression or recess 52, which is of such length that as the projecting end of the valve stem 48 rides therein said valve will be permitted to move to open position with the effect to set the brakes. The relatively upper wall of the recess 52 is formed so that the block in its downward movement will gradually force the valve to closed position.

The operation of the improved indicator is as follows: Under the movement of the axle 12 rotation is imparted to the governor shaft 4, and by the governor shaft through the shafts 26 and 27 to the proper mileage dial 32 or 33 in accordance with the direction in which the engine is traveling. As the governor shaft rotates the arms 36 are gradually elevated with the effect to elevate the collar 39 and thereby draw upward upon the end of the lever 41 to which the rod 46 is connected and depress the opposing end of said lever. The depressed end of the lever through the link 42 will actuate the pointer 31 and thereby indicate the speed at which the engine is traveling. As the speed of the engine increases the rod 46 is gradually raised until the block 49 is elevated to dispose the recess 52 opposite the valve stem 48. The valve will then automatically open with the effect to bleed the train pipe and set the brakes. As the block 49 is adjustable on the rod 46, it is obvious that the automatic actuation of the brakes can be set for any desired speed, this being usually accomplished by removing the cover 35 and manually elevating the arms 36 until the pointer indicates the desired speed. The block 49 is then adjusted on the rod 46 so that the valve stem 48 will enter the recess 52. With the block secured in this position through the set screw 51, it will be obvious that when the speed previously determined on has been noted by the pointer 31 the block 49 will be in position to permit movement of the valves to set the brakes. In this connection it is to be understood that the door 45 through which access is gained to the casing 44 is to be locked beyond the control of other than certain authorized persons, so that when the device has been set for a particular speed it cannot be readjusted without the knowledge of the persons holding the keys.

The device provides a mechanism whereby the maximum speed of a train may be regulated, thereby insuring against an excess of speed and preventing danger and accidents resulting from such excess speed.

If desired the rod 46 may be graduated to indicate marks for setting the block at certain speeds, thereby dispensing with the necessity of operating the governor arms in adjusting the block.

Having thus described the invention what is claimed as new, is:—

1. An indicator including a governor, a elver actuated by the governor, a speed indicator actuated by the lever, a braking pressure controlling valve, and an operating block movable with the lever and adapted to engage the valve, said block being formed with a recess to permit free movement of the valve in a certain position of the block.

2. An indicator comprising a governor shaft, means for operating said shaft from a moving part of the vehicle, a dial, mileage dials carried by the main dial, a shaft driven from the governor shaft and adapted to operate the mileage dial mechanisms, a speed indicating pointer carried by the main dial, a lever, a connection between one end of said lever and the speed indicating pointer, a governor carried by the governor shaft, a connection between said governor and the lever, a rod connected to one end of the lever, an operating block adjustably mounted on the rod and formed with a recess, and a fluid pressure brake controlling valve having a stem disposed in contact with the block, whereby in the operation of the lever said block will be elevated to permit the stem to enter the recess in the block.

In testimony whereof I affix my signature in presence of two witnesses.

NEWNAN C. FORBUS.

Witnesses:
 JAS. H. WRIGHT,
 W. T. FORRESTEL.